United States Patent Office 2,971,922
Patented Feb. 14, 1961

2,971,922

ORGANOPHILIC MINERAL COMPOSITIONS

Arthur G. Clem, Des Plaines, Ill., assignor to American Colloid Company, Skokie, Ill., a corporation of Delaware No Drawing. Filed Sept. 23, 1957, Ser. No. 685,386

11 Claims. (Cl. 252—316)

This invention relates to compositions of matter comprising clay and a fatty acid amide. More particularly this invention relates to compositions in which a clay is rendered organophilic by admixture with an amide of a fatty acid containing at least 10 carbon atoms.

The compositions of matter which comprise this invention have the desirable properties of being organophilic and they swell in non-polar organic solvents and form stable gels. They are of value in bodying organic liquids used in paints, waxes, polishes, printing inks and the like and may also be used in the production of greases, gelled fuels, adhesives, paint removers and similar products. In combination with rust inhibitors they are of value in the production of bodied lubricants. In combination with oils they are of value in the formulation of foundry sand core compositions having desirable compressive strengths.

It is an object of this invention to provide new and useful colloidal clay products. It is another object of this invention to provide colloidal clay products which are organophilic in nature and which may be compounded with non-polar organic liquids. It is a further object of this invention to provide colloidal organophilic clay compositions which are useful in swelling and gelling in organic liquids such as hydrocarbons, fuels and oils. It is an additional object to provide colloidal clay compositions which are organophilic and which may be used in the production of foundry sand core compositions. These and other objects will be apparent from and are achieved in accordance with the following disclosure.

Broadly the present invention comprises the formation of compositions of matter containing a colloidal clay and a fatty acid amide containing at least 10 carbon atoms. The colloidal clay may be of the montmorillonite group, such as bentonite or hectorite, or it may be of the palygorskite group, such as attapulgite or sepiolite. Other related clays, such as sodium, potassium and lithium bentonites, nontronite, illite, zeolites and fuller's earth may be used. The fatty acid amide is a substance of the general formula RCONHX wherein R is a hydrocarbon radical containing at least 10 carbon atoms and wherein X is hydrogen or an organic radical containing 1 to 25 carbon atoms. These amides may be prepared from the usual fatty acids, such as capric, undecyclic, undecylenic, lauric, myristic, palmitic, margaric, stearic, oleic, linoleic, linolenic, arachidic, behenic, lignoceric, cerotic, montanic, melissic and ricinoleic acids which contain from 10 to 25 carbon atoms, the fatty acids providing the acyl (RCO—) radicals of the amides. The radical X may be a hydrocarbon radical, such as an alkyl radical, including methyl, ethyl, propyl, butyl, amyl and hexyl radicals, or it may be an aryl radical, such as phenyl, tolyl, xylyl or naphthyl. In addition, the radical X may be represented by the radical RCONHCH$_2$CH$_2$— wherein R has the same meaning as that indicated above. In such case the amide is derived from the fatty acid by reaction with ethylenediamine. Other organic diamines containing 3 to 10 carbon atoms may also be used in preparing diamides of the foregoing type, having the general formula RCONH—Alk—NHCOR wherein R has the meaning given above and Alk is an alkylene radical containing 2 to 10 carbon atoms. The amides which are used in producing the compositions of the present invention are neutral in character and will not form cations on treatment with acid.

The compositions of matter which comprise this invention are produced by admixing the colloidal clay with a given quantity of fatty acid amide. The amount of the fatty acid amide is so selected that it constitutes 30 to 75% of the final product. Generally the compositions wherein the fatty acid amide comprises about 50% (45–55%) of the product are desirable. The relative quantities of clay and amide are so selected that the proper degree of gelling and bonding property of an oil sand composition will be produced. Naturally the relative quantities of materials will vary over a fairly wide range depending upon the fatty acid amide selected, the type of clay and the intended use of the composition.

The preferred method of making the compositions of this invention comprises melting the fatty acid amide and raising the temperature of the molten mass to a value in the range of 250 to 400° F. The temperature is not critical because its primary function is to reduce the viscosity of the liquid and to improve absorption of the amide by the colloidal clay. To the molten mass of fatty acid amide is added the desired quantity of the dry colloidal clay. Preferably this is done in small quantities with good agitation to assure intimate contact of the clay with the amide. After the requisite amount of clay is added, the mass is allowed to cool and is ground to a fine waxy powder.

In addition to the method described above, the compositions of this invention may be produced in a variety of other methods. For instance, the dry colloidal clay and the fatty acid amide may be placed in a dry ingredient blender and heated during mixing so that the amide is melted and the molten organic amide is infused into the mineral substance. Another method of preparation is to melt the amide and spray it on to the colloidal clay while the latter is being agitated in a ribbon-type blender. In another procedure, the fatty acid amide may be dissolved in a suitable solvent and the solution admixed with colloidal clay after which the solvent can be evaporated, leaving the residue of clay-amide composition.

Whatever method of compounding the composition is used, it is important that the fatty acid amide be thoroughly admixed with the clay so that it may penetrate into the clay and be absorbed between the plates or rods which form the crystal structure of the clay. Toward this end it may be desirable to add substances which either reduce the viscosity of the molten liquid amide or increase the penetrating ability of the liquid organic material into the dry mineral substance. For the first purpose free fatty acids may be used to reduce the melting point and the viscosity of the fatty acid amide and to improve its wettability. For the latter purpose nonionic surface-active detergents and wetting agents may be used, such as polyoxyethylene glycols, fatty acid esters of polyoxyethylene glycols, polyoxyethylene derivatives of hexitol anhydride and fatty acid esters of polyoxyethylene derivatives of hexitol anhydride. Where desired, rust-proofing agents may be added to the compositions, such as the insoluble stearates of lime, aluminum or iron.

It appears that the compositions which comprise this invention consist essentially of a coating of fatty acid amide on the fiber or plate crystal structure of the clay.

This coating is water-insoluble but is compatible with oils and other organic liquids. Slight agitation of the clay-fatty acid amide product in an oil or an organic solvent causes the mineral to break apart at the junctions of plates or fibers and to swell in the organic liquid, thereby creating a gelled mass. The swelling and gel-forming properties of these products may be illustrated by mixing one part of the finely ground fatty acid amide-clay composition with approximately 10 times its apparent volume of a non-polar organic liquid such as toluene. When this mixture is shaken by hand for a few minutes to wet the solid material uniformly with the organic liquid, the mixture will swell after a few minutes standing to at least 50% of the volume of the toluene due to absorption of the toluene into the colloidal clay product. This amounts to a five-fold increase in the volume of the clay product in toluene which is a satisfactory value for a hydrocarbon solvent. Known organic swelling agents, such as aluminum stearate, swell to a lesser extent in toluene.

The following illustrates the use of the colloidal fatty acid amide-clay derivatives in foundry practice. A mixture of two parts of the mineral-amide composition of Example 1 with 48 parts of graded, washed and dried silica sand (approximately 60 to 65 mesh average) containing 1 part of oil (API viscosity of 100 seconds at 100° F.) was mixed and molded into a foundry sand core composition. On testing this product had a compressive strength of 5 lbs. per square inch. Similar clay-amide products made with the same fatty acid amide as that described above were prepared, compounded with sand and oil, tested, with the following results:

| Clay, parts | Amide, parts | Compressive Strength, lbs. | Swelling in Toluene |
|---|---|---|---|
| Bentonite 100 | 60 | 5.0 | 5-fold. |
| Do | 100 | 5.2 | 6-fold. |
| Sepiolite 100 | 100 | 5.5 | 10-fold. |
| Bentonite 50 | } 100 | 5.2 | 8-fold. |
| Sepiolite 50 | | | |
| Sepiolite 100 | 98 | 5.3 | 9-fold. |

The last composition in the table was produced with 3 parts of stearic acid admixed with the amide to lower viscosity and improve the wetting properties of the molten amide.

The invention is further disclosed by means of the following examples which are provided solely for the purposes of illustrating the invention and not to limit its scope. It will be appreciated by those skilled in the art that numerous modifications in quantities of materials, equivalent materials, temperatures, times and the like, may be made without departing from this invention. In the examples, the relative amounts of materials are given in parts by weight and temperatures are recorded in degrees Fahrenheit.

*Example 1*

100 parts of the fatty acid diamide produced by heating tallow with ethylene diamine, having the formula $CH_3-(CH_2)_n-CO-NH-CH_2-$ 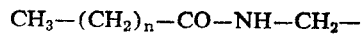

$CH_2-NH-CO-(CH_2)_n-CH_3$ 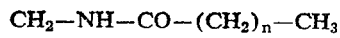

wherein $n$ is a number between 14 and 16 (average value of $n$ is 15.7), was melted and heated to 340° F. The molten diamide was stirred and to it was added 100 parts of alpha-sepiolite in small portions with efficient agitation. After the addition of the sepiolite (about 15 to 30 minutes) agitation was stopped and the mixture was allowed to cool to room temperature. It was then ground to a waxy powder. When suspended in an excess of toluene, this product swelled 6-fold and formed a stable gel.

*Example 2*

60 parts of the diamide described in Example 1 were melted and heated to 350° F. To the melt was added 5 parts of the stearic acid ester of polyoxyethylene glycol. Then 140 parts of Wyoming bentonite were added to the melt with good agitation over a period of 20 minutes. The mixture was chilled to room temperature and ground to a fine waxy powder. This product swelled 7-fold in toluene and formed a stable gel.

*Example 3*

Clay-amide compositions were prepared as in Example 1 according to the following formulas, with the following results:

| | Composition | Gelling In Toluene, percent | Compressive Strength, Lbs. |
|---|---|---|---|
| A | 100 parts attapulgite<br>100 parts stearamide<br>2 parts alkanolamine soap of tallow acids | 50 | 7.3 |
| B | 150 parts bentonite<br>95 parts stearamide<br>5 parts polyethylene glycol rosin acid ester | 40 | 4.5 |
| C | 100 parts bentonite<br>95 parts stearamide<br>5 parts polyethylene glycol stearate | 55 | 6.3 |
| D | 100 parts bentonite<br>90 parts stearamide<br>10 parts polyethylene glycol stearate | 66 | 5.3 |
| E | 100 parts sepiolite<br>100 parts stearamide | 90 | 5.0 |
| F | 50 parts attapulgite<br>50 parts methylene distearamide | 50 | 7.4 |
| G | 50 parts bentonite<br>50 parts methylene distearamide | 35 | 2.5 |
| H | 50 parts bentonite<br>50 parts methylene distearamide<br>10 parts alkanolamine soap of unsaturated fatty acids | 55 | 5.1 |
| I | 50 parts sepiolite<br>50 parts methylene distearamide | 80 | 5.5 |

In the above formulations, the gelling in toluene was measured by suspending a quantity of the clay-amide composition in a large volume of toluene and measuring the volume of the resulting gel in cubic centimeters. The compressive strengths were measured by admixing 2 parts of the clay-amide composition with 48 parts of washed sand containing 1 part of oil (100-second viscosity), as disclosed above, and measuring the compressive strength of the foundry composition, the results being given in lbs. per square inch.

What is claimed as new and is desired to be obtained by Letters Patent of the United States is:

1. An organophilic mineral composition consisting essentially of 25 to 70 parts by weight of a clay of the group consisting of montmorillonite and palygorskite and 30 to 75 parts by weight of a water-insoluble neutral amide of the group consisting of R—CO—NH—X and RCONH—Alk—NHCOR, wherein R is a hydrocarbon radical containing at least 10 and not more than 25 carbon atoms, X is a member of the group consisting of hydrogen and hydrocarbon radicals containing not more than 25 carbon atoms and Alk is an alkylene radical containing at least 2 and not more than 10 carbon atoms.

2. An organophilic mineral composition as defined by claim 1 wherein the clay is montmorillonite.

3. An organophilic mineral composition as defined by claim 1 wherein the clay is palygorskite.

4. An organophilic mineral composition as defined by claim 1 wherein the clay is bentonite.

5. An organophilic mineral composition as defined by claim 1 wherein the clay is sepiolite.

6. An organophilic mineral composition as defined by claim 1 wherein the clay is attapulgite.

7. An organophilic mineral composition consisting essentially of 25 to 70 parts by weight of bentonite and 30 to 75 parts by weight of stearamide.

8. An organophilic mineral composition consisting essentially of 25 to 70 parts by weight of attapulgite and 30 to 75 parts by weight of stearamide.

9. An organophilic mineral composition consisting essentially of 25 to 70 parts by weight of sepiolite and 30 to 75 parts by weight of stearamide.

10. An organophilic mineral composition consisting essentially of 25 to 70 parts by weight of bentonite and 30 to 75 parts by weight of methylene distearamide.

11. An organophilic mineral composition consisting essentially of 25 to 70 parts by weight of attapulgite and 30 to 75 parts by weight of methylene distearamide.

References Cited in the file of this patent

UNITED STATES PATENTS

| | | |
|---|---|---|
| 2,623,852 | Peterson | Dec. 30, 1952 |
| 2,661,301 | Capell | Dec. 1, 1953 |
| 2,681,314 | Skinner et al. | June 15, 1954 |
| 2,748,081 | Peterson et al. | May 29, 1956 |